United States Patent
Babol et al.

(10) Patent No.: US 11,520,609 B2
(45) Date of Patent: Dec. 6, 2022

(54) TEMPLATE-BASED SOFTWARE DISCOVERY AND MANAGEMENT IN VIRTUAL DESKTOP INFRASTRUCTURE (VDI) ENVIRONMENTS

(71) Applicant: International Business Machines Corporation, Armonk, NY (US)

(72) Inventors: Adam Babol, Lubartów (PL); Jan Galda, Nowy Sacz (PL); Piotr P. Godowski, Cracow (PL); Lukasz Tomasz Jęda, Cracow (PL); Jacek Midura, Zabierzów (PL)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 15/705,482

(22) Filed: Sep. 15, 2017

(65) Prior Publication Data

US 2019/0087204 A1    Mar. 21, 2019

(51) Int. Cl.
*G06F 9/451* (2018.01)
*G06F 9/455* (2018.01)
(Continued)

(52) U.S. Cl.
CPC .......... *G06F 9/452* (2018.02); *G06F 9/45533* (2013.01); *G06F 9/45537* (2013.01);
(Continued)

(58) Field of Classification Search
None
See application file for complete search history.

(56) References Cited

U.S. PATENT DOCUMENTS

| 10,083,054 B2 * | 9/2018 | Thomas | G06F 8/61 |
| 2012/0089666 A1 * | 4/2012 | Goswami | G06Q 10/103 |
| | | | 709/203 |

(Continued)

OTHER PUBLICATIONS

"FlexNet Manager Suite For Enterprises: Desktop-to-Datacenter Software License Optimization Solution," Data Sheet https://www.flexerasoftware.com/enterprise/products/software-license-management/flexnet-manager-suite-enterprises/, Mar. 2017.

(Continued)

*Primary Examiner* — Qing Yuan Wu
*Assistant Examiner* — Melissa A Headly
(74) *Attorney, Agent, or Firm* — Jeffrey S. LaBaw; David H. Judson

(57) ABSTRACT

A technique to manage software licensing in an environment that provides virtual desktop infrastructure (VDI). A license manager is configured to receive first information identifying software applications associated with a virtual machine template used in the infrastructure, as well as second information that a user has logged into the VDI from a client device, thereby creating a VDI session. For a particular time period of interest, the license manager calculates software application usage information from the first and second information. Preferably, the software application usage information represents an application count that is based on the user and the client device "pair" when the user has the VDI session during at least some portion of the time period. The software application usage information is provided to one or more other computing systems to take a given action, such as tracking, managing, auditing, enforcing and accounting for software usage in the VDI environment.

21 Claims, 5 Drawing Sheets

(51) Int. Cl.
    *G06F 21/10*     (2013.01)
    *G06F 21/12*     (2013.01)
    *G06F 11/34*     (2006.01)
    *H04L 67/141*     (2022.01)
    *H04L 67/01*     (2022.01)
    *G06F 9/50*     (2006.01)

(52) U.S. Cl.
    CPC ............ *G06F 9/5027* (2013.01); *G06F 11/34* (2013.01); *G06F 21/105* (2013.01); *G06F 21/121* (2013.01); *G06F 2009/45562* (2013.01); *G06F 2009/45575* (2013.01); *G06F 2009/45591* (2013.01); *H04L 67/01* (2022.05); *H04L 67/141* (2013.01)

(56) References Cited

U.S. PATENT DOCUMENTS

| | | |
|---|---|---|
| 2012/0246647 A1 | 9/2012 | Ciano et al. |
| 2013/0080641 A1* | 3/2013 | Lui ........................ H04L 43/045 709/226 |
| 2014/0189102 A1* | 7/2014 | Fruchtman ............ G06F 21/105 709/224 |
| 2015/0281322 A1 | 10/2015 | Dingwell et al. |
| 2015/0358392 A1 | 12/2015 | Ramalingam et al. |
| 2016/0173487 A1 | 6/2016 | Griffith et al. |
| 2017/0139738 A1* | 5/2017 | Kim ........................ G06F 9/452 |
| 2018/0130171 A1 | 5/2018 | Prakash et al. |

OTHER PUBLICATIONS

Emmitt et al., "License Management For Desktop Virtualization—Managing A Compliant Desktop Landscape," http://itak.iaitam.org/license-management-for-desktop-virtualization-managing-a-compliant-desktop-landscape/, Jun. 24, 2013.

U.S. Appl. No. 16/398,431, Office action, dated May 15, 2020.

* cited by examiner

TEMPLATE-BASED SOFTWARE DISCOVERY AND MANAGEMENT IN VIRTUAL DESKTOP INFRASTRUCTURE (VDI) ENVIRONMENTS

BACKGROUND OF THE INVENTION

Technical Field

This disclosure relates generally to managing applications in a "cloud" compute environment.

Background of the Related Art

A popular information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Software as a Service (SaaS) refers to the capability provided to the consumer is to use a provider's applications running on a cloud infrastructure. SaaS applications are accessible from various client devices through a thin client interface such as a web browser. In this model, typically the consumer does not manage or control the underlying cloud infrastructure including network, servers, operating systems, storage, or even individual application capabilities.

One common application class that has been increasingly deployed in the cloud is desktop virtualization. A virtual desktop infrastructure (VDI) typically provides a stateless thin client to the user while hosting the processing and storage resource in a remote virtual machine. In this environment, a core component is a central VDI server that manages a pool of computers (physical or virtual). The virtual machines may be existing already, or they may be spawned on-demand. The user (accessing from remote location) has a device, such as a computer, a terminal, a mobile device, or the like) with a VDI client installed. The client connects to the VDI server, which in turn affords the user remote access to a desktop of one of the computers in the pool. The user may then use one or more applications that are installed on the machine.

In this operating scenario, and for security, compliance or other business requirements, the cloud provider needs to monitor application usage, preferably by way of an "install-based" metric of application licensing wherein all applications that are installed (i.e., available to the user) are counted as being used. Known solutions, however, have not adequately addressed such software license consumption monitoring in this context. In part, this is a consequence of the fact that the lifetime of the virtual machines being managed by the VDI server can be very short (e.g., hours, or even minutes). Also, it is well-known that desktops are characterized by long periods of inactivity (i.e., idleness), during which virtual machines may be down-sized to consume a minimal amount of resources required for the desktop. Traditional approaches to monitoring license usage in this operating environment are unsatisfactory.

The technique of this disclosure addresses the need.

BRIEF SUMMARY

This disclosure provides a technique to manage software licensing in a cloud (or other network-accessible) computing environment and, in particular, an environment that provides virtual desktop infrastructure (VDI). Typically, the VDI infrastructure comprising a VDI server that manages a pool of virtual machines. According to one embodiment, a license manager is provided to facilitate preferably "install-based" metrics for application license management. To this end, the license manager is configured to receive first information identifying one or more software applications associated with a virtual machine template used in the virtual desktop infrastructure. The license manager also receives second information that a user has logged into the virtual desktop infrastructure from a client device, thereby creating a VDI session, the session being associated with a virtual machine template. For a particular time period of interest, the license manager determines software application usage information from the first and second information. Preferably, the software application usage information is associated with a licensing model that defines a usage metric based at least in part on the user having the session during at least some portion of the time period. When an "install-based" licensing model is used, the usage metric represents an application count that is based on a user and client device "pairing" when the user has the VDI session during at least some portion of the time period. The software application usage information is then provided to one or more other computing systems to take a given action, such as tracking, managing, auditing, enforcing and accounting for software usage in the VDI environment.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
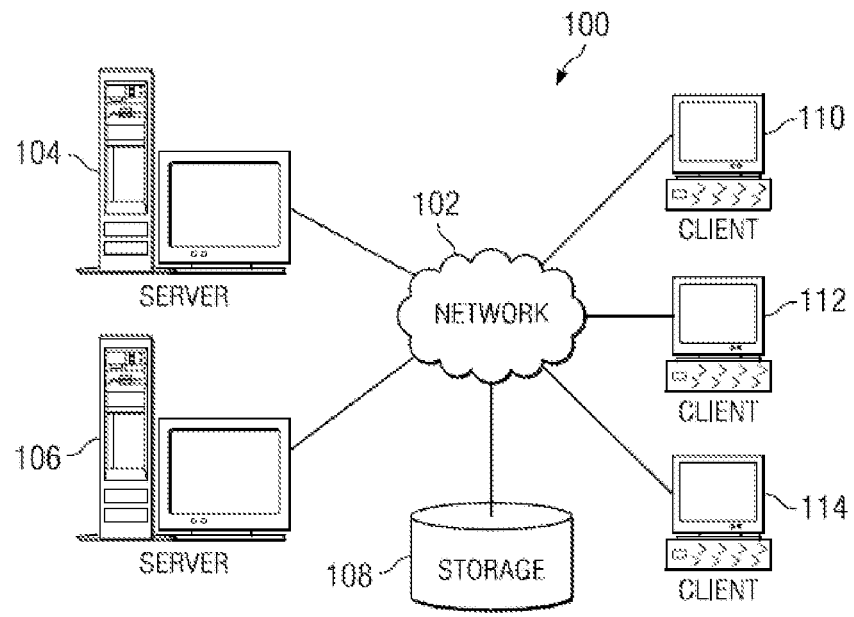
FIG. 1 depicts an exemplary block diagram of a distributed data processing environment in which exemplary aspects of the illustrative embodiments may be implemented.
Figure 2:
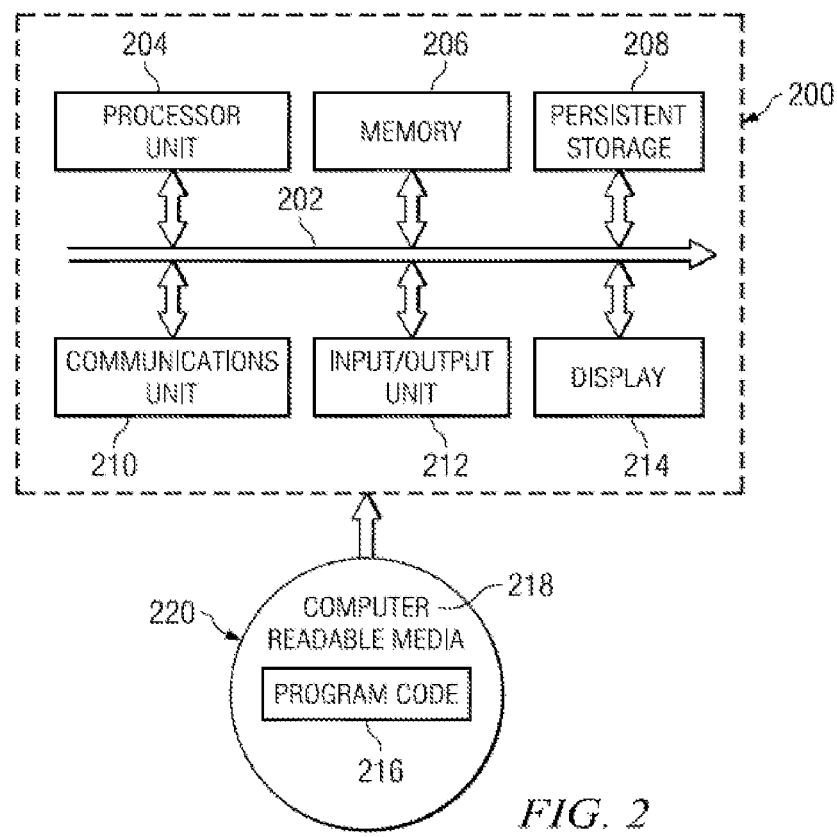
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

Client-server technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
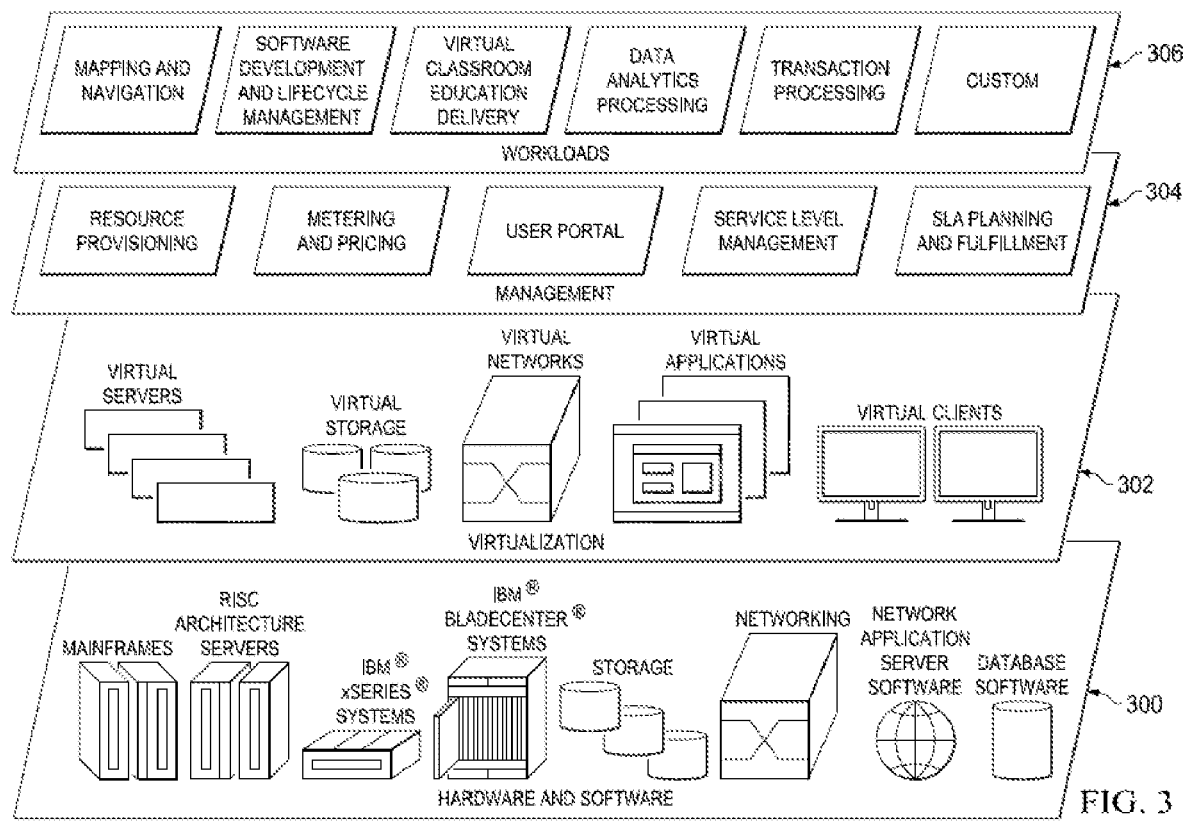
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud). It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 4:
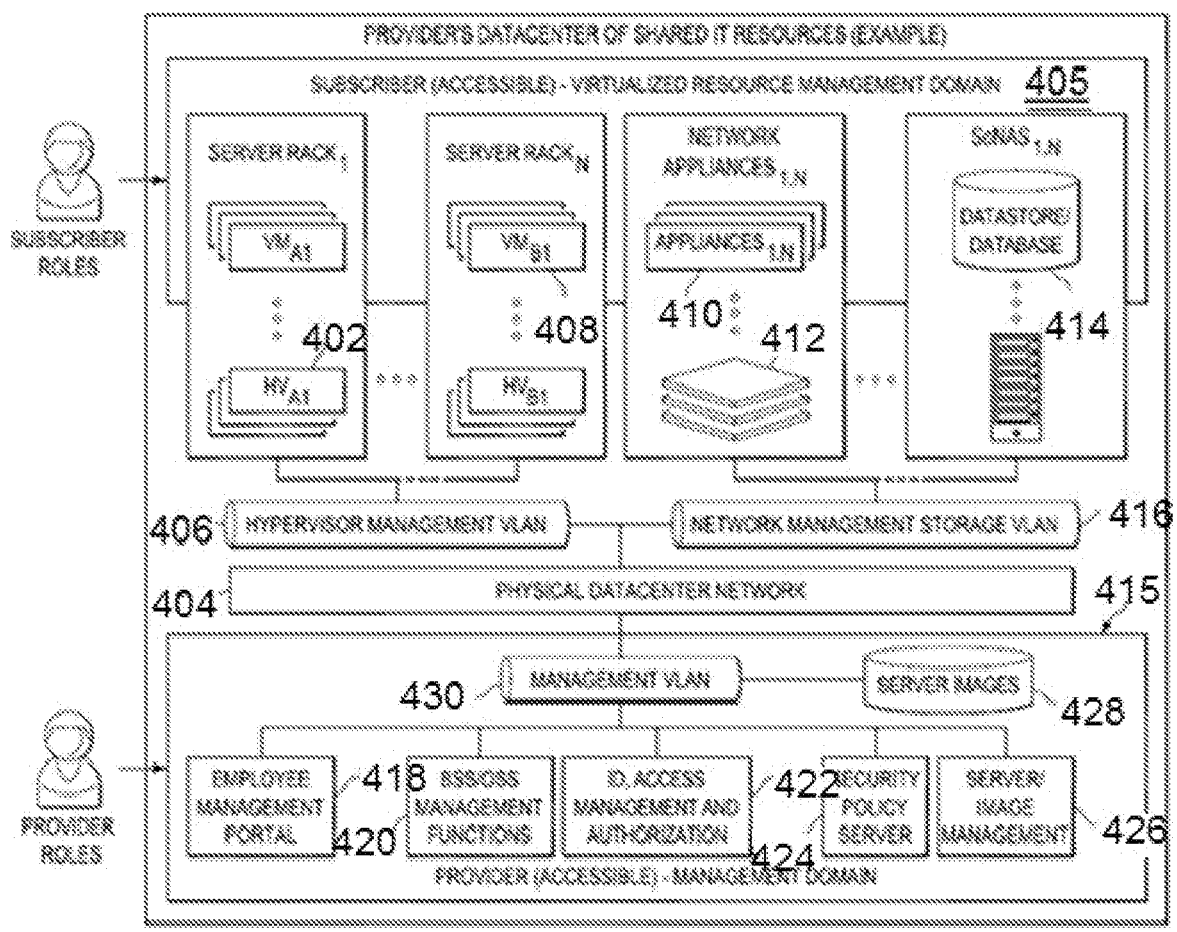
FIG. 4 depicts an exemplary data center in which the techniques of this disclosure may be implemented.

FIG. 4 illustrates a typical IT infrastructure that supports virtualization of resources and in which the below-described techniques of this disclosure may be implemented. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

It is also known in the art to configure or provision cloud architectures such as described above to include mechanisms and systems that operate generally to gather (or otherwise obtain from other data sources) information about available cloud platforms, topologies and capabilities. Typically, cloud security may be implemented and enforced with various techniques that include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others.

An example security and management platform that provides real-time visibility and control across endpoints, whether connected to the cloud or otherwise, is IBM® BigFix®. IBM BigFix, formerly IBM Endpoint Manager, Tivoli Endpoint Manager (TEM) and before that, BigFix, is a systems management software product for managing large groups of computers running Windows, Mac, OS/X, VMware ESX, Linux or UNIX, as well as various mobile operating systems such as Windows Phone, Symbian, iOS and Android. IBM BigFix provides system administrators with remote control, patch management, software distribution, operating system deployment, network access protection and hardware and software inventory functionality. It addresses a major challenge faced by many organizations, namely, how to gain full visibility into the constantly changing endpoint landscape while bridging the gap between threat detection and remediation.

Cloud application packages may be deployed using platform-as-a-service (PaaS) infrastructure, such as the IBM® Cloud open cloud management platform (also known as SmartCloud® Orchestrator), or IBM® Bluemix™, which is an open-standards, cloud-based platform for building, managing, and running apps of all types, such as web, mobile, big data, and smart devices. Bluemix capabilities include Java, mobile back-end development, and application monitoring, as well as features from ecosystem partners and open source, all provided as-a-service in the cloud. Bluemix abstracts and hides most of the complexities that are associated with hosting and managing cloud-based applications. Bluemix is based on Cloud Foundry open technology and runs on SoftLayer infrastructure. Using Bluemix, an application developer can focus on developing the cloud application without having to manage the infrastructure that is required to host it. For mobile apps, the developer can use pre-built services that are provided by Bluemix. For web apps, the developer can upload the application to Bluemix and indicate how many instances to run. Then, Bluemix takes care of the deployment. After the apps are deployed, a user can easily scale them up or down when the usage or load of the apps change.

When the user creates an application and deploys it to Bluemix, the Bluemix environment determines an appropriate virtual machine (VM) to which the application or artifacts that the application represents is sent. For a mobile application, a mobile back-end projection is created on Bluemix. Any code for the mobile app running in the cloud eventually runs in the Bluemix environment. For a web app, the code running in the cloud is the application itself that the developer deploys to Bluemix. The determination of the VM is based on several factors, including: the load already on the machine, and runtimes or frameworks supported by that VM. After a VM is chosen, an application manager on each VM installs the proper framework and runtime for the application. Then the application can be deployed into that framework.

The cloud computing environment may also include various deployment and management tools. For example, IBM Cloud includes IBM® Cloud Manager with OpenStack. Cloud Manager is a self-service portal for simplified cloud management for the cloud end user. Cloud Manager with OpenStack enables the user to work with virtual appliances and workloads focusing on the end user's perspective, rather than the IT or systems administrator's perspective. Self-service capabilities simplify the process of executing many common public or private cloud operations such as provisioning and de-provisioning servers (process known as deploying), drafting and cloning deployments, taking deployment snapshots, starting up and shutting down servers, and resizing existing servers. Cloud management solutions of this type typically also provide the user an ability to create virtual machines using templates. For example, IBM Cloud Manager with OpenStack includes VMware. VMware virtual machine (VM) template is a master copy of a virtual machine, and it is widely used by VMware to create new virtual machines. The VMware driver of IBM® Cloud Manager with OpenStack allows the user to create instances from a VM template, and to create a VM template image from a running instance.

Virtual Desktop Infrastructure

As additional background, and as noted above, one common application class that has been increasingly deployed in the cloud is desktop virtualization implemented as a virtual desktop infrastructure (VDI). VDI typically provides a stateless thin client to the user while hosting the processing and storage resource in a remote virtual machine. In this environment, a core component is a cloud-supported (sometimes referred to herein as a "central") VDI server that manages a pool of computers (physical or virtual). There may be multiple VDI servers in the infrastructure. In one representative VDI environment, each user has their own virtual machine that runs on or in association with a VDI server and is accessed and controlled using a given remote display protocol (RDP). A remote display protocol is a set of data transfer rules that provide for a desktop hosted at the central VDI server to display on a client's screen at a remote location. Popular remote display protocol technologies include VMware's PC over IP (PCoIP), Microsoft's RemoteFX and others. The virtual machines may be existing already, or they may be spawned on-demand. The user (accessing from the remote location) has a device, such as a computer, a terminal or appliance, a mobile device, or the like), typically with a VDI client installed. The client connects to the VDI server, which in turn affords the user remote access to a desktop of one of the computers in the pool. The user may then use one or more applications that are installed on the machine.

Generalizing, the VDI server is a desktop virtualization software that allows multiple users to access and run desktops that are installed at a centralized location separate from the devices from which they are being accessed. A representative VDI server is Citrix® XenDesktop. It manages all the user sessions and corresponding virtual machines that are being spawned to handle these sessions. Information about all events in the VDI environment (session start/end, VM spawn/destroy etc.) are stored in the XenDesktop database and are then available for retrieval, either directly from the database or through an OData API. Both methods to access data require authentication. XenDesktop keeps historical data for seven (7) days by default.

Figure 5:
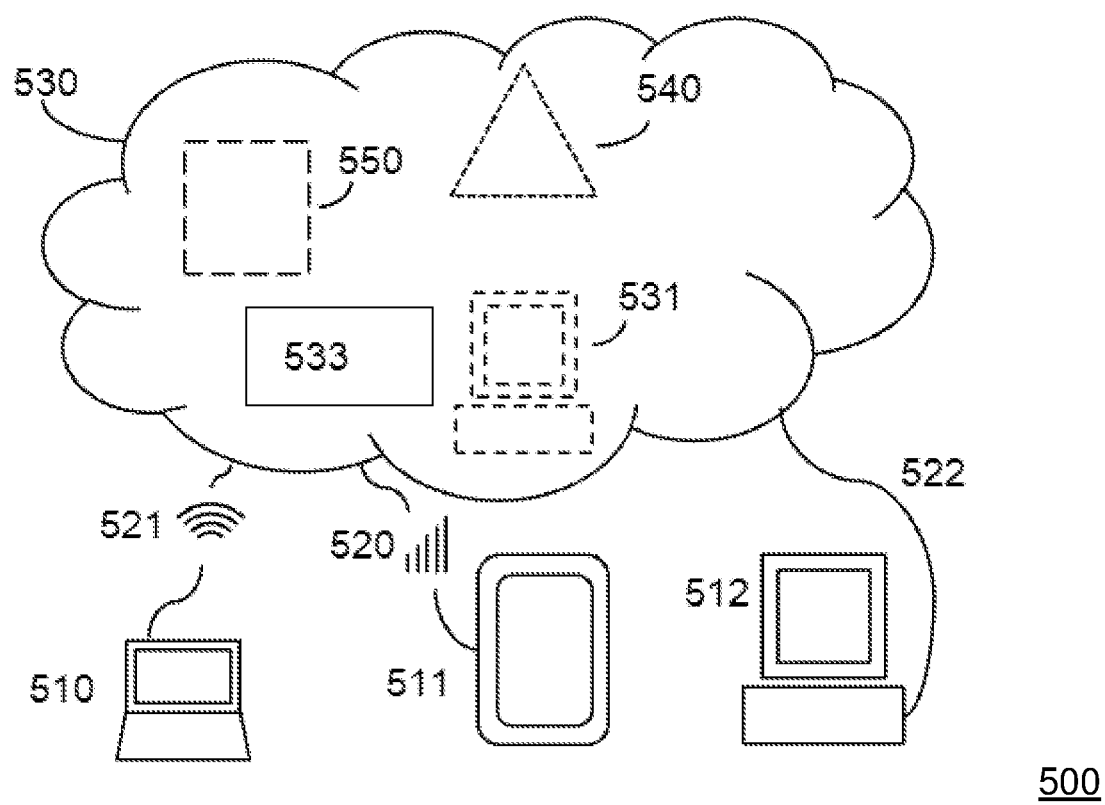
FIG. 5 illustrates an exemplary operating environment that includes a license management system according to this disclosure.

Template-Based Software Discovery in a Virtual Desktop Infrastructure (VDI) Environment With the above as background, the technique of this disclosure is now described. A representative VDI operating environment is shown in FIG. 5, which depicts a computer system 500 comprising client devices 510, 511, 512 connected via a communication network 520, 521, 522 to a computing infrastructure 530. Computing infrastructure may be implemented as described above in FIGS. 3 and 4. The client devices 510, 511, 512 (such as depicted in FIG. 2) may comprise a notebook 510, a tablet computer 511 or a fixed computer 512. The communication network may be a mobile communication network 520, e.g., an LTE network, a WIFI network 521 or an Ethernet (or other wired) network 522. A user may log in to the computing infrastructure 530 via one of the client devices 510, 511, 512, for example, via the client device 510. Typical client-server interaction in this context is depicted in FIG. 1. The computing infrastructure (e.g., FIG. 4) comprises a hypervisor 540 for instantiating a virtual machine 531 in response to the user 540 logging in to the computing infrastructure. A remote desktop is provided to the client device 510 such that the user may interact with the virtual machine 531. Alternatively, a user logging in to the computing infrastructure 530 may be connected to an already present instance of a virtual machine image. Typically, in a VDI environment such as shown, each user has their own virtual machine that runs on the VDI server 533 and is accessed and controlled using a remote desktop protocol. A representative VDI server is XenDesktop, as previously noted. According to this disclosure, and in one embodiment, the cloud computing environment includes or has associated therewith a license management system 550 that provides various application discovery, monitoring and management functions, as are now described. The license management system 550 typically is implemented as software (one or more computer programs) executed in one or more hardware processors. The license management system 550 may be a standalone function or module, or a component of some other system, device, program or process.

As will be described, the license management system is configured to determine "software application usage information," which typically includes information about the software applications that were made available to the user from a virtual machine. One of many existing software licensing models is that the software application usage information need not include particular details on the user's actual usage of any particular software application, but rather merely that the software application was made available to the user during the session. Thus, preferably the license management system assumes an "install-based" metric of application licensing. In the preferred approach herein, and as described below, all applications that are installed (i.e., available to the user) are counted as used by a particular pair (namely, user and client device) over a particular time period (e.g., a day) if the user has a VDI session during that time period connecting from the client device. While the install-based metric is preferred, in an appropriate circumstance, the software application usage information may include particular use information.

The license management system 550 (sometimes referred to herein as a license manager) provides for VM template-based software and discovery and management in the VDI environment, as is now described. One embodiment involves a common use scenario in which a new VM is instantiated when a new user session is created and then destroyed at session end. In this embodiment, the license manager 550 preferably is configured to retrieve session information about a user logged in to the computing infrastructure 530 via the client device 510. The time a user is logged in to the computing infrastructure 530 typically is a session. As used herein, a "session" corresponds to a period of uninterrupted activity of the user accessing a remote desktop. The session information may include various data such as one or more of: start date and time of the session, end date and time of the session, user identification associated with the session, and/or client device identification of the client device. In this embodiment, which is non-limiting, instantiation of the virtual machine for the user corresponds with user session start, and a particular user session with a VDI VM may also be described herein as a "virtual desktop connection."

The license manager 550 is further configured to receive or to determine a list of software applications available in a virtual machine template, which is sometimes referred to herein as an "image." This is sometimes referred to herein as "software discovery." Typically, every virtual machine instance based on the virtual machine image allows a user to use any software application available in the virtual machine image. The list of software applications can be obtained in various ways depending on the underlying cloud computing implementation, e.g., in a BigFix implementation the license management system interacts (e.g., via a request-response protocol, inter-process communication, or the like) with BigFix Inventory, which provides the software discovery functionality. In the alternative, the license management system may implement this function natively. Another approach is to simply manually create the list of the software present in the virtual machine image. Typically, the list is a text file with application names and versions. Generalizing, the list can be obtained automatically, programmatically, manually or the like, by scanning single virtual machines created from the template, by creating lists of program names manually, etc.

Thus, and according to this disclosure, a list of software installed on a virtual machine template (used to spawn virtual machines for users) is obtained. The software list is then associated with a history of virtual desktop connections that is maintained, for example, in a database of the VDI server. This association enables monitoring of software license consumption. As noted above, preferably software application usage data is determined as an "install-based" metric. This notion of application licensing means that all applications that are installed (i.e. available to the user are counted as used by a particular user/client device pair over a time period of interest if there is virtual desktop connection (i.e. the user has a VDI session in that time period connecting from the client device). In one embodiment, the number of VMs does not count for application licensing purposes; rather, what is counted is a number of pairs <user><client device> that access the VDI infrastructure, and wherein the client device may be of any type. Thus, for example, if a user U1 connects to VDI from two different terminals T1 and T2, preferably the license manager counts this access as two license usages. If users U1 and U2 connect to VDI from the same terminal T1, it also counts as two usages. If user U1 connects from terminal T1 and user U2 connects from terminal T2, it is still two usages, irrespective of how many VMs handled these sessions.

Figure 6:
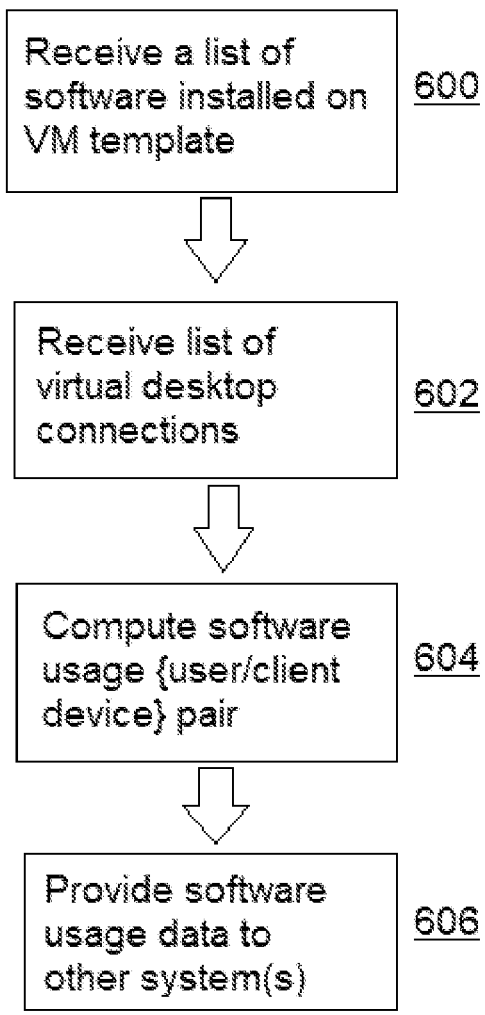
FIG. 6 depicts a representative process flow describing an operation of the license management system.

FIG. 6 is a process flow detailing the above-described operation of the license manager. To this end, the license manager routine begins at step 600 by preparing a list of software installed on the VM template (a "first list"). Preferably there is a separate first list for every VM template. At step 602, the license manager obtains from the VDI server (or other cloud resource that has the information) a second list, namely, a list of virtual desktop connections for a particular time period. In one embodiment (e.g., where the VDI server is XenDesktop or an equivalent) a virtual desktop connection entry in the second list typically is defined by the following information: when the connection started, when the connection ended, a network or other address of the device that is connecting to a virtual desktop, a name or other identifier for the user, and an identification of the template that was used to spawn the VM for the connection. At step 604, the information obtained in steps 600 and 602 is combined to create software application usage information for the desired time period In particular, for every connection read from the VDI server, the routine identifies the VM template used to create the VM to which the user is connected; then, and for every application present on the list of software installed on this particular VM template, the license usage information (typically the usage count, as noted above) is generated. As noted, the license usage information typically comprises: application identification (obtained from the VM template software list), start date and time (obtained from the VDI server connection information), end data and time (obtained from the VDI server connection information), user identification (obtained from the VDI server connection information), and terminal device identification (obtained from the VDI server connection information). This completes the discovery process.

At step 606, the software application usage information is then provided to one or more other systems, sub-systems, programs or processes within or otherwise associated with the cloud computing environment. Thus, for example, the data is used for reporting and (with user- or system-defined thresholds) to notify interested persons, entities or systems about usage that exceeds a license quota or that is about to exceed the quota. The information may be provided to an inventory management or accounting system. The information may be provided to a security or compliance policy system that implements or facilitates mitigation or remediation of an over usage, e.g., when the license manager counts reflect that usage may deny service to another tenant. The information may be provided to other systems, e.g., to facilitate VDI or cloud computing infrastructure administration, maintenance, operations or otherwise.

In the above-described embodiment, the connection start and end times are sufficient because they represent the information that the license manager needs, namely, the uninterrupted activity of the user accessing the remote desktop (because only then are the installed applications available to the user). Thus, in the usual case the license manager uses connection start and end timestamps for reporting application usage for the "session." That said, in some VDI server environments if a connection end timestamp is unknown for any reason (e.g., because the user disconnects and reconnects a remote desktop session without logging out), the connection information may be amended or supplanted with other information, such as an end timestamp taken from the session to which the connection belongs.

The subject matter herein provides significant advantages. The approach herein enables a service provider to monitor license usage for software in a VDI environment. Traditional approaches to monitoring license usage in this context (e.g., installing a program on a machine that scans installed software and monitors running processes) are not useful in the VDI environment, wherein virtual machine lifetime is often too short to perform such scans. The license manager overcomes the shortcomings of these prior art approaches and provides for accurate install-based metrics for application licensing. The license manager provides this advantage by counting all applications that are installed (i.e., available to the user) as used by a particular pair (namely, user and client device) over a particular time period (e.g., a day) if the user has a VDI session during that time period connecting from the client device. By accounting for software usage in this manner, the approach herein enables the cloud provider to accurately track, manage, audit, and account for software usage in the VDI environment.

The license management system (or any component thereof) may be part of some other system (e.g., an inventory or log management solution), or part of other cloud management or security architecture. The license manager may be implemented as a solution, service, product, appliance, device, process, program, one or more execution threads, or the like. Typically, and as noted, the techniques are implemented in software, as one or more computer programs executed in hardware processing elements, in association with data stored in one or more data sources. Some or all of the processing steps described may be automated and operate autonomously in association with other systems. The automation may be full- or partial, and the operations (in whole or in part) may be synchronous or asynchronous, demand-based, or otherwise.

Without limitation, the license manager (as a product or service) may be implemented within or in association with a cloud platform system or appliance (FIG. 4) as has been described, or using any other type of deployment systems, products, devices, programs or processes. As previously noted, the above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the license management system product or service be executed by a particular component as named above, as the functionality herein (or any aspect thereof) may be implemented in other or systems. In addition, the nature of the particular licensing scheme being enforced by the license management system is not a particular requirement.

The license manager may be implemented by a cloud service provider that operates infrastructure for a private cloud, a public cloud, or a hybrid cloud. It may be available as a managed service provided by a cloud service or some other service provider.

There may be alternative embodiments. The system may be separated into multiple sub-systems, which then work together or cooperatively. For example, instead of having a single license management system for the entire infrastructure, there may be several of such systems, perhaps one for each of the tenants (or tenant types) in the infrastructure. Each system (or sub-system, as the case may be) may then feed the information to a master system, which generates the desired results.

The techniques herein may be extended to other cloud models including PaaS and IaaS.

As described, the approach herein may be implemented manually or in an automated manner, in whole or in part.

While a preferred operating environment and use case (a cloud appliance or platform) has been described, the techniques herein may be used in any other operating environments.

The approach may be integrated in a VDI server, or the like.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment as described above, the functionality provided herein is implemented as an adjunct or extension to an existing cloud compute VDI solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, software license management solutions and cloud computing environments, as well as improvements to the functioning of related inventory management facilities and systems.

As noted, unless otherwise specified, the nature, type and semantics of the software application usage data and what that data is used for (e.g., auditing, compliance, etc.) is not a limitation of this disclosure.

The identification of any commercial product herein is not intended to limit the scope of the subject matter.

While the license manager preferably enforces an "install-based" licensing model, it may also be used with other models including, without limitation, "usage-based," wherein the actual usage of the application is what is counted, "hardware-based," wherein license cost is based on the hardware specifications on which the software runs, combinations thereof, and the like. Further, the license manager may be configured to count licenses against users only, without reference to the client devices they use. In this latter scenario (counting licenses per users), there may additional variations, e.g., "named users" (wherein every user of the software application must be uniquely identified and the total number of possible users of the software is what is counted), "concurrent users," (wherein a maximum numbers of users accessing the software application at a given time is what is counted), and so forth.

Having described our invention, what we claim is as follows.

The invention claimed is:

1. An apparatus, comprising:
a hardware processor;
computer memory holding computer program instructions executed by the processor to provide license management in a computing infrastructure comprising a server that manages a pool of virtual machines, the computer program instructions comprising program code configured to:
receive first information identifying one or more software applications that are installed in a virtual machine template used in the virtual desktop infrastructure;
receive second information identifying, for a particular time period, a list of a plurality of virtual desktop connections, wherein each of the plurality of the virtual desktop connections indicates that a respective user has logged into a respective virtual desktop infrastructure from a respective client device, thereby creating a respective session that is identified for a respective user/client device pair;
for the particular time period, determine a respective install-based metric of software application usage for each user/client device pair, wherein the determining of an install-based metric for the user/client device pairs comprises:
for each respective user/client device pair:
identifying the software applications installed for the virtual machine template, from the received first information, associated with the respective user/client device pair;
counting the identified software applications from the first information; and
storing the count as the install-based metric for the user/client device pair;
determining that a respective install-based metric for the one or more user/client device pairs exceeds one or more predefined usage thresholds;

and
   in response to the determining, provide the respective install-based metric of software application usage to another computing system to remediate an over usage of resources by the user associated with the install-based metric that exceeds the one or more predefined usage thresholds.

2. The apparatus as described in claim 1 wherein the computing infrastructure is a virtual desktop infrastructure (VDI).

3. The apparatus as described in claim 2 wherein the server is a VDI server and the second information represents a plurality of virtual desktop connections between respective client devices and the VDI server.

4. The apparatus as described in claim 2 wherein the plurality of sessions are VDI sessions and the second information comprises one of: start date and time of the plurality of VDI sessions, end date and time of the plurality of VDI sessions, an identification of users associated with each of the plurality of VDI sessions, and an identification of each client device associated with each of the plurality of VDI sessions.

5. The apparatus as described in claim 1 wherein the second information identifies a client device that is a stateless thin client.

6. The apparatus as described in claim 5 wherein the computing infrastructure includes program code configured to spawn a virtual machine from the virtual machine template to provide a virtual desktop for a user of a client device.

7. The apparatus as described in claim 1 wherein at least one application of the software applications identified as installed and counted to provide the install-based metric is not accessed via the given virtual desktop connection during the session.

8. A computer program product in a non-transitory computer readable medium for use in a data processing system, the computer program product holding computer program instructions executed by the data processing system to provide license management in a computing infrastructure comprising a server that manages a pool of virtual machines, the computer program instructions comprising program code configured to:
   receive first information identifying one or more software applications that are installed in a virtual machine template used in the virtual desktop infrastructure;
   receive second information identifying, for a particular time period, a list of a plurality of virtual desktop connections, wherein each of the plurality of the virtual desktop connections indicates that a respective user has logged into a respective virtual desktop infrastructure from a respective client device, thereby creating a respective session that is identified as a respective user/client device pair;
   for the particular time period, determine a respective install-based metric of software application usage for each user/client device pair, wherein the determining of an install-based metric for the user/client device pairs comprises:
     for each respective user/client device pair:
       identifying the software applications installed for the virtual machine template, from the received first information, associated with the respective user/client device pair;
       counting the identified software applications from the first information; and
       storing the count as the install-based metric for the user/client device pair;
and
   determining that a respective install-based metric for the one or more user/client device pairs exceeds one or more predefined usage thresholds;
and
   in response to the determining, provide the respective install-based metric of software application usage to another computing system to remediate an over usage of resources by the user associated with the installed-based metric that exceeds the one or more predefined usage thresholds.

9. The computer program product as described in claim 8 wherein the computing infrastructure is a virtual desktop infrastructure (VDI).

10. The computer program product as described in claim 9 wherein the server is a VDI server and the second information represents a plurality of virtual desktop connections between respective client devices and the VDI server.

11. The computer program product as described in claim 9 wherein the plurality of sessions are VDI sessions and the second information comprises one of: start date and time of the plurality of VDI sessions, end date and time of the plurality of VDI sessions, an identification of users associated with each of the plurality of VDI sessions, and an identification of each client device associated with each of the plurality of VDI sessions.

12. The computer program product as described in claim 8 wherein the second information identifies respective client devices that is are stateless thin client.

13. The computer program product as described in claim 12 wherein the computing infrastructure includes program code configured to spawn a virtual machine from the virtual machine template to provide a virtual desktop for the users of the respective client devices.

14. The computer program product as described in claim 8 wherein at least one application of the software applications identified as installed and counted to provide the install-based metric is not accessed via the given virtual desktop connection during the session.

15. A method for license management in a computing infrastructure comprising a server that manages a pool of virtual machines, comprising:
   receiving first information identifying one or more software applications that are installed in a virtual machine template used in the virtual desktop infrastructure;
   receiving second information identifying, for a particular time period, a list of a plurality of virtual desktop connections, wherein each of the plurality of the virtual desktop connections indicates that a respective user has logged into a respective virtual desktop infrastructure from a respective client device, thereby creating a respective session that is identified for a respective user/client device pair;
   for the particular time period, determine a respective install-based metric of software application usage for each user/client device pair, wherein the determining of an install-based metric for the user/client device pairs comprises:
     for each respective user/client device pair:
       identifying the software applications installed for the virtual machine template, from the received first information, associated with the respective user/client device pair;
       counting the identified software applications from the first information; and
       storing the count as the install-based metric for the user/client device pair;

determining that a respective install-based metric for the one or more user/client device pairs exceeds one or more predefined usage thresholds; and in response to the determining, providing the respective install-based metric of software application usage information to another computing system to remediate an over usage of resources by the user associated with the install-based metric that exceeds the one or more predefined usage thresholds.

16. The method as described in claim 15 wherein the computing infrastructure is a virtual desktop infrastructure (VDI).

17. The method as described in claim 16 wherein the server is a VDI server and the second information represents a virtual desktop connection between the client device and the VDI server.

18. The method as described in claim 16 wherein the plurality of sessions is area VDI sessions and the second information comprises one of: start date and time of the plurality of VDI sessions, end date and time of the plurality of VDI sessions, an identification of the users associated with each of the plurality of VDI sessions, and an identification of the each client device associated with each of the plurality of VDI sessions.

19. The method as described in claim 15 wherein the second information identifies a client device that is a stateless thin client.

20. The method as described in claim 19 further including spawning a virtual machine from the virtual machine template to provide a virtual desktop for the user of the client device.

21. The method as described in claim 15 wherein at least one application of the software applications identified as installed and counted to provide the install-based metric is not accessed via the given virtual desktop connection during the session.

* * * * *